United States Patent
Baba et al.

(10) Patent No.: US 9,566,573 B2
(45) Date of Patent: Feb. 14, 2017

(54) EXHAUST GAS PURIFYING CATALYST, METHOD FOR PRODUCING SAME, AND EXHAUST GAS PURIFICATION METHOD USING SAME

(71) Applicant: MAZDA MOTOR CORPORATION, Hiroshima (JP)

(72) Inventors: Takashi Baba, Hiroshima (JP); Hiroshi Yamada, Hiroshima (JP); Koichiro Harada, Hiroshima (JP); Yoshiyuki Sato, Hiroshima (JP); Masahiko Shigetsu, Higashi-Hiroshima (JP); Akihide Takami, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/430,769

(22) PCT Filed: Aug. 20, 2014

(86) PCT No.: PCT/JP2014/004260
§ 371 (c)(1),
(2) Date: Mar. 24, 2015

(87) PCT Pub. No.: WO2015/029382
PCT Pub. Date: Mar. 5, 2015

(65) Prior Publication Data
US 2015/0251169 A1 Sep. 10, 2015

(30) Foreign Application Priority Data
Aug. 28, 2013 (JP) .................................. 2013-176649

(51) Int. Cl.
*B01J 23/46* (2006.01)
*B01J 29/068* (2006.01)
(Continued)

(52) U.S. Cl.
CPC .......... *B01J 29/068* (2013.01); *B01D 53/9468* (2013.01); *B01J 23/464* (2013.01);
(Continued)

(58) Field of Classification Search
CPC . B01J 23/464; B01J 37/0246; B01J 2523/822; B01J 2531/822; B01D 53/9468; B01D 2255/2065; B01D 2255/1025; B01D 2255/9025; B01D 2255/9027; B01D 2510/0684; F01N 2510/0684
See application file for complete search history.

(56) References Cited

U.S. PATENT DOCUMENTS 6,518,213 B1 2/2003 Yamamoto et al.
2001/0022956 A1 9/2001 Okamoto et al.
(Continued)

FOREIGN PATENT DOCUMENTS

CN 103028429 A 4/2013
EP 0904827 A1 3/1999
(Continued)

OTHER PUBLICATIONS

International Search Report; PCT/JP2014/004260; Nov. 25, 2014.

*Primary Examiner* — Jonathan Matthias
(74) *Attorney, Agent, or Firm* — Studebaker & Brackett PC

(57) ABSTRACT

An exhaust gas purify catalyst includes a substrate (1), an oxidation catalyst layer (2) formed on the substrate (1) and containing zeolite and at least one catalytic metal, an LNT layer (3) formed on the oxidation catalyst layer (2) and containing an $NO_x$ storage material and at least one catalytic metal, and an $NO_x$ reduction layer (4) formed on the LNT layer (3) and containing Rh acting as a catalytic metal and at least one of alumina or zirconia, wherein the $NO_x$ reduc-
(Continued)

tion layer (4) has a larger content of Rh than that in each of the oxidation catalyst layer (2) and the LNT layer (3).

7 Claims, 4 Drawing Sheets

(51) Int. Cl.

| | | |
|---|---|---|
| *F01N 3/28* | (2006.01) | |
| *B01J 37/02* | (2006.01) | |
| *B01J 35/00* | (2006.01) | |
| *B01J 23/63* | (2006.01) | |
| *B01J 35/02* | (2006.01) | |
| *B01D 53/94* | (2006.01) | |
| *B01J 23/58* | (2006.01) | |
| *B01J 35/04* | (2006.01) | |
| *F01N 3/18* | (2006.01) | |
| *F02D 41/02* | (2006.01) | |
| *F01N 3/08* | (2006.01) | |
| *F01N 3/10* | (2006.01) | |

(52) U.S. Cl.
CPC .............. *B01J 23/58* (2013.01); *B01J 23/63* (2013.01); *B01J 35/0006* (2013.01); *B01J 35/023* (2013.01); *B01J 35/04* (2013.01); *B01J 37/0201* (2013.01); *B01J 37/0244* (2013.01); *B01J 37/0246* (2013.01); *F01N 3/18* (2013.01); *F01N 3/2828* (2013.01); *F02D 41/0235* (2013.01); *B01D 53/944* (2013.01); *B01D 53/9418* (2013.01); *B01D 53/9422* (2013.01); *B01D 2255/1021* (2013.01); *B01D 2255/1023* (2013.01); *B01D 2255/1025* (2013.01); *B01D 2255/2042* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/20715* (2013.01); *B01D 2255/50* (2013.01); *B01D 2255/9025* (2013.01); *B01D 2255/91* (2013.01); *B01D 2255/912* (2013.01); *B01D 2255/9202* (2013.01); *B01J 2229/18* (2013.01); *F01N 3/0842* (2013.01); *F01N 3/103* (2013.01); *F01N 2510/0684* (2013.01)

(56) References Cited

U.S. PATENT DOCUMENTS

| | | |
|---|---|---|
| 2001/0053340 A1 | 12/2001 | Noda et al. |
| 2002/0141908 A1 | 10/2002 | Miyoshi et al. |
| 2003/0115855 A1 | 6/2003 | Miyoshi et al. |
| 2008/0219906 A1* | 9/2008 | Chen ................. B01D 53/945 423/213.5 |
| 2009/0209408 A1 | 8/2009 | Kitamura et al. |
| 2010/0186375 A1 | 7/2010 | Kazi et al. |
| 2013/0340414 A1 | 12/2013 | Bergeal et al. |

FOREIGN PATENT DOCUMENTS

| | | |
|---|---|---|
| JP | H08-10566 A | 1/1996 |
| JP | H11-104462 A | 4/1999 |
| JP | 2000-271443 A | 10/2000 |
| JP | 2001-113173 A | 4/2001 |
| JP | 2001-310131 A | 11/2001 |
| JP | 2003-093887 A | 4/2003 |
| JP | 2005-169203 A | 6/2005 |
| JP | 2006-068665 A | 3/2006 |
| JP | 2006-226190 A | 8/2006 |
| JP | 2008-100152 A | 5/2008 |
| JP | 2009-208045 A | 9/2009 |
| JP | 2012-515087 A | 7/2012 |
| JP | 2013-528119 A | 7/2013 |
| JP | 2003-220339 A | 8/2013 |
| WO | 2011/154913 A1 | 12/2011 |
| WO | 2012/085572 A2 | 6/2012 |

* cited by examiner

EXHAUST GAS PURIFYING CATALYST, METHOD FOR PRODUCING SAME, AND EXHAUST GAS PURIFICATION METHOD USING SAME

TECHNICAL FIELD

The present invention relates to exhaust gas purifying catalysts, methods for producing such catalysts, and methods for purifying exhaust gas using such catalysts.

BACKGROUND ART

An exhaust gas treatment system for diesel engines generally includes a diesel oxidation catalyst (DOC) and a diesel particulate filter (DPF) which is arranged downstream of the DOC. The DOC oxidizes and purifies hydrocarbon (HC) and carbon monoxide (CO) in exhaust gas, and oxidizes, among nitrogen oxides ($NO_x$), nitrogen monoxide (NO) into nitrogen dioxide ($NO_2$). The heat of catalytic reaction generated by the DOC increases the temperature of the DPF, and the high oxidizability of $NO_2$ promotes combustion of particulate matters (PMs) deposited on the DPF. Since activity of the DOC is low immediately after start-up of the engine, zeolite is provided for the DOC as an HC trapping material to prevent HC from being exhausted without being purified.

On the other hand, a lean $NO_x$ trap catalyst (LNT catalyst) is also utilized in lean-burn gasoline engines or diesel engines to purify $NO_x$. An $NO_x$ storage material in the LNT catalyst stores $NO_x$ when the air-fuel ratio of an exhaust gas is lean. A rich purge changes the air-fuel ratio in the engine to rich, and releases $NO_x$ and reduces $NO_x$ with unburned gas. An alkali metal or an alkali earth metal may be used as the $NO_x$ storage material. However, an alkali metal forms a glass phase on the grain boundaries of cordierite forming a catalyst substrate to reduce strength of the substrate. Therefore, an alkali earth metal is actually adopted in general, because it will not cause such a problem.

As disclosed in Patent Document 1, in an exhaust gas purifying catalyst for gasoline engines which has been proposed, an HC adsorbent layer containing zeolite and a catalytic metal layer containing an $NO_x$ storage material are stacked one upon the other on a monolithic support. This can adsorb HC and $NO_x$ simultaneously in the exhaust gas immediately after start-up of the engine. Release of HC and $NO_x$ and reaction between that HC and that $NO_x$ after activation of the catalytic metal can purify both HC and $NO_x$.

CITATION LIST

Patent Document

PATENT DOCUMENT 1: Japanese Unexamined Patent Publication No. 2001-113173

SUMMARY OF THE INVENTION

Technical Problem

As disclosed in Patent Document 1, a catalyst has been already proposed which includes an HC adsorbent layer and a catalytic metal layer containing an $NO_x$ storage material, and has HC adsorption ability and LNT ability. This catalyst purifies $NO_x$ when HC having been desorbed from the lower layer reaches the upper layer, and reacts with $NO_x$ trapped in the upper layer. However, the range of a temperature at which HC is desorbed is limited, and it is not clear whether the amount of HC desorbed is sufficient to purify $NO_x$ under various driving conditions. Accordingly, if $NO_x$ is reduced and purified using the HC desorbed, unpurified $NO_x$ is very likely to be left.

In view of stricter regulations of vehicle emissions in the future, a catalyst is required which can achieve LNT performance more efficiently while maintaining high-ability to oxidize HC and CO or having increased oxidizability thereof. To meet this requirement, it is necessary to devise a layer structure of catalytic layers and its composition in view of not only the conventional technique of purifying $NO_x$ by use of desorption of HC but also improvement of HC adsorption and purification abilities, and reduction and purification of $NO_x$.

The present invention has been developed in view of the above problems. The present invention is intended to provide an exhaust gas purifying catalyst including a catalytic layer having ability to oxide HC and CO and a catalytic layer having ability to reduce $NO_x$, and capable of purifying HC, CO, and $NO_x$ with high efficiency.

Solution to the Problem

In order to provide such a catalyst, an exhaust gas purifying catalyst according to the present invention has a structure in which an LNT layer is stacked on an oxidation catalyst layer, and an $NO_x$ reduction layer containing Rh acting as a catalytic metal having high ability to reduce $NO_x$ is disposed on the LNT layer.

Specifically, an exhaust gas purifying catalyst according to the present invention includes: a substrate; an oxidation catalyst layer formed on the substrate, and containing zeolite and at least one catalytic metal; an LNT layer formed on the oxidation catalyst layer, and containing an NOx storage material and at least one catalytic metal; an NOx reduction layer formed on the LNT layer, and containing Rh acting as a catalytic metal and at least one of alumina or zirconia, wherein the NOx reduction layer has a larger content of Rh than in each of the oxidation catalyst layer and the LNT layer.

In the exhaust gas purifying catalyst according to the present invention, HC in the exhaust gas is adsorbed on zeolite in the oxidation catalyst layer when a catalyst temperature is low. As the catalyst temperature rises, the HC is released from zeolite. The HC released is oxidized and purified together with CO in the exhaust gas by catalytic metals of which the activity have increased with the rise in temperature. $NO_x$ is stored in the $NO_x$ storage material of the LNT layer when the air-fuel ratio of the exhaust gas is lean, and is released when the air-fuel ratio reaches the vicinity of a theoretical air-fuel ratio or gets rich. That $NO_x$ released is reduced and purified by the Rh acting as a catalytic metal in the $NO_x$ reduction layer. The $NO_x$ reduction layer is disposed on the LNT layer, that is, adjacent to the exhaust gas passage. The $NO_x$ passes through the $NO_x$ reduction layer when being released from the LNT layer to the exhaust gas passage. Since the $NO_x$ reduction layer has a larger content of Rh than that in other layers, the $NO_x$ reduction layer can efficiently reduce and purify the $NO_x$ released. The $NO_x$ reduction layer contains zirconia and alumina which have an affinity for Rh. This is advantageous for efficiently containing Rh in the $NO_x$ reduction layer.

In the exhaust gas purifying catalyst according to the present invention, the oxidation catalyst layer preferably includes a first oxidation catalyst layer containing alumina and ceria, and a second oxidation catalyst layer formed on the first oxidation catalyst layer and containing zeolite.

In this structure, since zeolite is arranged in the upper level of the oxidation catalyst layer, this works favorably to adsorb HC in the exhaust gas. Further, the catalytic metal loaded on zeolite efficiently purifies the HC desorbed from zeolite. Also, adsorption of $NO_x$ by ceria in the first oxidation catalyst layer increases the overall amount of $NO_x$ stored/adsorbed, and a water gas shift reaction via ceria generates hydrogen serving as an $NO_x$ reducing agent to promote reduction of $NO_x$. Furthermore, when the air-fuel ratio is turned rich, the heat generated through reaction between the oxygen stored in ceria and a reducing agent (HC and CO) promotes the activity of the catalyst, thereby increasing NOx purification rate.

In the exhaust gas purifying catalyst according to the present invention, the LNT layer preferably further contains alumina and ceria.

In this structure, containing alumina leads to improvement of heat resistant properties. And as well as the above description, adsorption of $NO_x$ by ceria in the first oxidation catalyst layer increases the overall amount of $NO_x$ stored/adsorbed, and a water gas shift reaction via ceria generates hydrogen serving as an $NO_x$ reducing agent to promote reduction of $NO_x$. Furthermore, when the air-fuel ratio is turned rich, the heat generated through reaction between the oxygen stored in ceria and a reducing agent (HC and CO) promotes the activity of the catalyst, thereby increasing NOx purification efficiency.

In the exhaust gas purifying catalyst according to the present invention, zeolite in the oxidation catalyst layer preferably has an average particle size of 0.5 μm or more and 4.8 μm or less.

A method for producing an exhaust gas purifying catalyst according to the present invention includes: forming an oxidation catalyst layer containing zeolite and at least one catalytic metal on a substrate; forming an LNT support material layer containing alumina and ceria on the oxidation catalyst layer; forming an Rh support material layer containing at least one of alumina or zirconia on the LNT support material layer; and by impregnating these layers on the substrate with a solution containing an $NO_x$ storage material and Rh acting as a catalytic metal, changing the LNT support material layer to an LNT layer containing the $NO_x$ storage material, and changing the Rh support material layer to an $NO_x$ reduction layer having a larger content of Rh than that in each of the oxidation catalyst layer and the LNT layer.

According to the method for producing the exhaust gas purifying catalyst according to the present invention, after the formation of the Rh support material layer containing at least one of alumina or zirconia which has an affinity for Rh as the uppermost layer, the Rh support material layer is impregnated with a solution including Rh acting as a catalytic metal and an $NO_x$ storage material. As a result, Rh is selectively rich in the Rh support material layer. In this way, the method allows for easy production of such a catalyst capable of achieving the above described advantages with the uppermost layer having a larger amount of Rh.

It is known that dissolution of the $NO_x$ storage material in the solution and penetration of the $NO_x$ storage material from the LNT layer to the oxidation catalyst layer degrade the HC adsorption ability of zeolite contained in the oxidation catalyst layer or oxidation catalyst ability of the oxidation catalyst layer. In this production method, the LNT support material layer containing alumina and ceria and the Rh support material layer are formed on the oxidation catalyst layer. Therefore, since the upper layer which is formed above the oxidation catalyst layer and contains ceria and alumina both having an affinity for the $NO_x$ storage material includes a larger amount of the $NO_x$ storage material, the content of the $NO_x$ storage material in the oxidation catalyst layer can be reduced. This can prevent degradation of the HC adsorption ability and the HC purification ability.

Another method for producing an exhaust gas purifying catalyst according to the present invention includes: forming an oxidation catalyst layer containing zeolite and at least one catalytic metal on a substrate; forming an LNT support material layer containing alumina and ceria on the oxidation catalyst layer; forming, on the LNT support material layer, an $NO_x$ reduction layer containing at least one of alumina on which Rh acting as a catalytic metal is preloaded or zirconia on which Rh acting as a catalytic metal is preloaded; and by impregnating these layers on the substrate with a solution containing an $NO_x$ storage material and Rh acting as a catalytic metal, changing the LNT support material layer to the LNT layer containing the $NO_x$ storage material and Rh acting as a catalytic metal, wherein each of the layers are formed such that the $NO_x$ reduction layer has a larger content of Rh than that in each of the oxidation catalyst layer and the LNT layer.

The use of the method for the exhaust gas purifying catalyst also allows for easy production of such a catalyst capable of achieving the above described advantages with the uppermost layer having a larger amount of Rh since the $NO_x$ reduction layer containing at least one of alumina preloading Rh or zirconia preloading Rh is formed as the uppermost layer. In this production method, since the upper layer which is formed above the oxidation catalyst layer containing ceria and alumina both having an affinity for the $NO_x$ storage material includes a larger amount of the $NO_x$ storage material, the content of the $NO_x$ storage material in the oxidation catalyst layer can be reduced. This can prevent degradation of the HC adsorption ability and the HC purification ability.

In a method for purifying exhaust gas according to the present invention, the above described exhaust gas purifying catalyst is disposed upstream of a particulate filter provided for an exhaust gas passage of an engine in a flow direction of exhaust gas, an air-fuel ratio of the exhaust gas is turned lean, and $NO_x$ in the exhaust gas is stored by the $NO_x$ storage material. Then, $NO_x$ is released from the $NO_x$ storage material when a predetermined amount or more of $NO_x$ is stored in the $NO_x$ storage material by controlling the engine such that a subsequent injection in which fuel is injected into and supplied to a combustion chamber of the engine in an expansion stroke or an exhaust stroke after a main injection in which fuel is injected into and supplied to the combustion chamber of the engine near a top dead center of a compression stroke is performed, thereby increasing HC or CO in the exhaust gas, and turning the air-fuel ratio of the exhaust gas rich. The $NO_x$ released is reduced and purified by Rh when passing through the $NO_x$ reduction layer. The particulate matters are burned when a predetermined amount or more of particulate matters is deposited on the particulate filter disposed on the downstream side by performing the subsequent injection after the main injection with the air-fuel ratio of the exhaust gas maintained lean, performing oxidative combustion of HC in the exhaust gas by Pt and Pd, and raising a temperature of the exhaust gas flowing into the particulate filter.

In the method for purifying exhaust gas according to the present invention, the single exhaust gas catalyst has both oxidation ability and LNT ability. $NO_x$ having been stored in the lean state is released by turning the state to the rich state, thereby being able to reduce and purify $NO_x$. In regeneration of the particulate filter, HC or CO having occurred in the subsequent injection of the fuel is subjected to oxidative combustion to be able to raise the temperature of the exhaust gas. Therefore, it is unnecessary to arrange plural catalysts having the respective functions independently, thereby enabling to reduce the capacity of the catalyst.

Advantages of the Invention

The exhaust gas purifying catalyst according to the present invention can purify HC, CO, and $NO_x$ with high efficiency. The method for producing the exhaust gas purifying catalyst according to the present invention enables to obtain such a catalyst easily. The method for purifying exhaust gas using the exhaust gas purifying catalyst according to the present invention can achieve reduction of the capacity of the catalyst since the one catalyst stores $NO_x$ in the lean state, reduces $NO_x$ in the rich condition, and raises the temperature of the exhaust gas with the heat generated during the oxidation in regeneration of the particulate filter.

DESCRIPTION OF EMBODIMENTS

An embodiment of the present invention will now be described with reference to the drawings. Note that the following description of preferred embodiments is merely illustrative in nature, and is not intended to limit the scope, applications, and use of the present disclosure.

(Structure of Catalyst)

Figure 1:
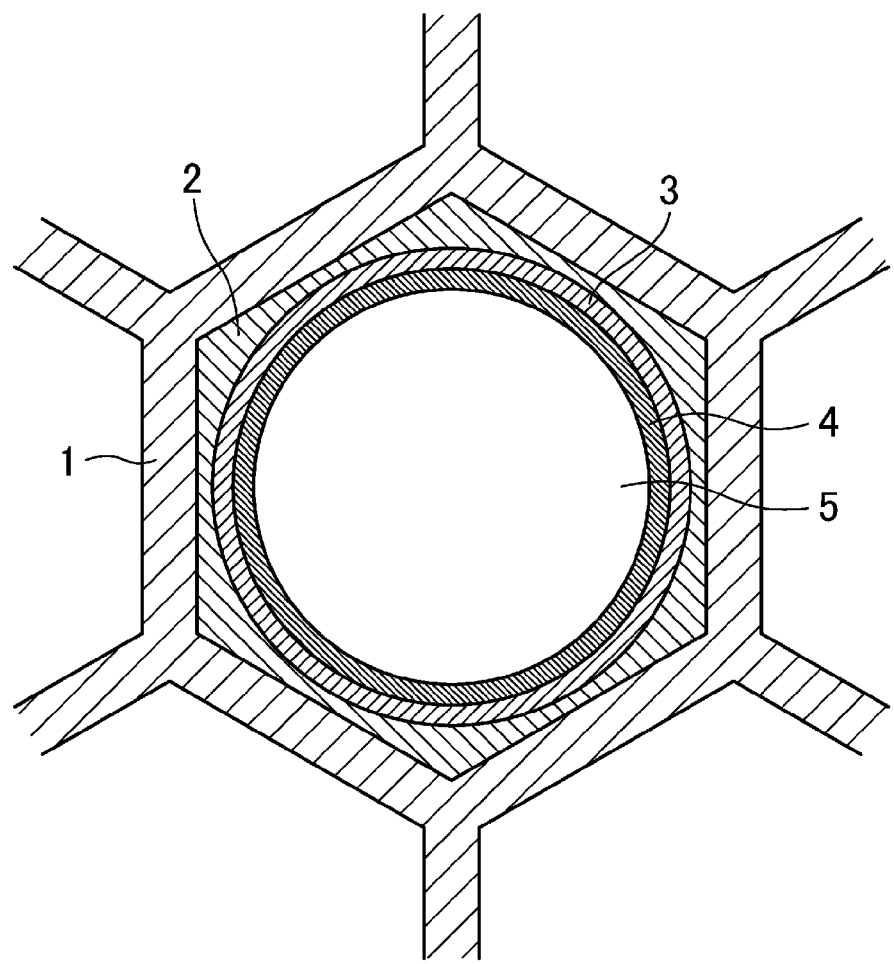
FIG. 1 is a cross-sectional view illustrating a portion of an exhaust gas purifying catalyst according to an embodiment of the present invention.

The structure of the exhaust gas purifying catalyst according to the embodiment of the present invention will be described with reference to FIGS. 1 and 2. FIG. 1 is a cross-sectional view illustrating a portion of the exhaust gas purifying catalyst according to the embodiment, and FIG. 2 is a cross-sectional view illustrating how respective catalytic layers are stacked one upon the other in the exhaust gas purifying catalyst.

Figure 2:
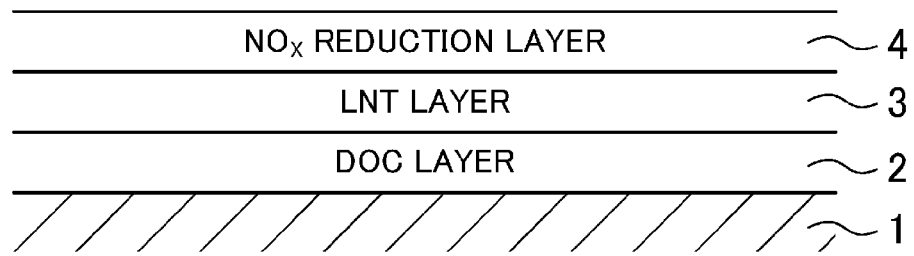
FIG. 2 is a cross-sectional view illustrating how respective catalytic layers are stacked one upon the other in the exhaust gas purifying catalyst according to the embodiment of the present invention.

As illustrated in FIGS. 1 and 2, the exhaust gas purifying catalyst according to the embodiment is a catalyst for purifying exhaust gas emitted from a diesel engine which is not illustrated. A DOC layer 2 which is an oxidation catalyst layer, an LNT layer 3 which is a catalytic layer for trapping $NO_x$ under a lean state, and an $NO_x$ reduction layer 4 are sequentially formed on a cell wall 1 of a honeycomb substrate. The space surrounded by these layers serves as an exhaust gas passage 5. The honeycomb substrate has a hexagonal cell honeycomb structure with a hexagonal cell cross section. In FIG. 1, the catalytic layers are illustrated as being provided for only one cell for the sake of simplicity. However, the catalytic layers are actually provided for every cell.

In this embodiment, the DOC layer 2 is formed on the cell wall 1 of the substrate, and in this layer, catalytic metals such as Pt and Pd are loaded on zeolite. The DOC layer 2 may include a mixture of activated alumina and ceria on which the catalytic metals are loaded. In the LNT layer 3 formed on the DOC layer 2, an $NO_x$ storage material and catalytic metals such as Pt and Rh are loaded. In the LNT layer 3, the $NO_x$ storage material and the catalytic metals are preferably loaded on activated alumina and ceria. This activated alumina can be replaced with an activated alumina-containing composite oxide (complex oxide) stabilized by, e.g., Zr and/or La, or a composite oxide containing activated alumina and, e.g., ceria, Zr, Nd, and/or Pr. In the $NO_x$ reduction layer 4 formed on the LNT layer 3, Rh acting as a catalytic metal is loaded on at least one of alumina or zirconia. The content of Rh in the $NO_x$ reduction layer 4 is larger than that in each of the DOC layer 2 and the LNT layer 3. This allows $NO_x$ that has been stored in the $NO_x$ storage material of the LNT layer 3 with a lean air-fuel ratio of the exhaust gas to be released from the LNT layer 3 to the exhaust gas passage 5 through the $NO_x$ reduction layer 4 when the air-fuel ratio gets rich. As a result, Rh contained in a large amount in the $NO_x$ reduction layer 4 can efficiently reduce and purify $NO_x$.

Figure 3:
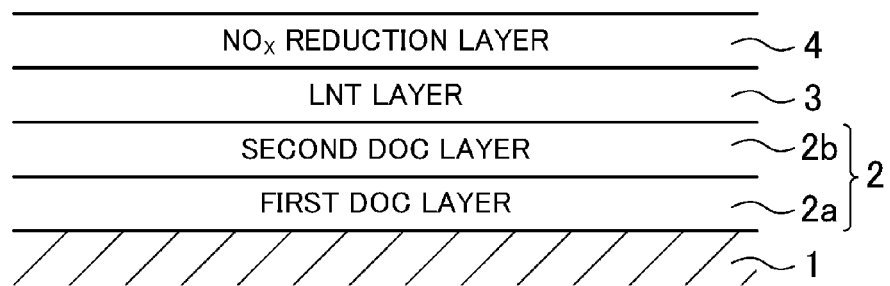
FIG. 3 is a cross-sectional view illustrating how respective catalytic layers are stacked one upon the other in an exhaust gas purifying catalyst according to a modified example of the embodiment of the present invention.

The catalyst that has been described above is the catalyst including the DOC layer 2 with a single-layer structure. The DOC layer 2 may have a double-layer structure of a first DOC layer 2a as the lower layer and a second DOC layer 2b as the upper layer, as illustrated in FIG. 3. In this structure, the first DOC layer 2a includes a mixture of activated alumina and ceria on which catalytic metals such as Pt and Pd are loaded, and the second DOC layer 2b includes zeolite on which catalytic metals such as Pt and Pd are loaded. With such a structure, zeolite is formed in the upper layer of the DOC layer 2, which is advantageous for adsorption of HC in the exhaust gas, and furthermore, the catalytic metals loaded on this zeolite efficiently purify HC desorbed from that zeolite.

The zeolite that is a component of the DOC layer 2 preferably has an average particle size (D50) of 0.5 μm or more and 4.8 μm or less. Too large average particle size reduces the exposed surface area of the particle to reduce the amount of HC adsorbed. Therefore, the particle size preferably has such a range.

(Method for Producing Catalyst)

Next, a method for producing an exhaust gas purifying catalyst according to the embodiment will be described.

First, how to prepare a DOC powder, that is a material for forming the DOC layer 2 containing catalytic components of zeolite, activated alumina, ceria, and Pt and Pd acting as catalytic metals will be described. In order to prepare the DOC powder, zeolite, activated alumina, and ceria are mixed together first, and the catalytic metals such as Pt and Pd are loaded on the mixture by evaporation to dryness method. Specifically, water is added to the mixture and the resulting mixture is stirred to prepare slurry mixture. While this slurry mixture is being stirred, a nitrate solution in which the catalytic metals are dissolved is dropped onto the slurry mixture. Then, the resulting slurry mixture is further stirred while being heated to vaporize the water completely. The resulting dried mixture is calcined in the air and then pulverized. As a result, a DOC powder is obtained. The DOC powder is preferably pulverized until the average particle size (D50) of zeolite becomes 0.5 µm or more and 4.8 µm or less.

The DOC layer 2 is formed on the cell wall 1 of the honeycomb substrate using the DOC powder prepared as described above. In order to form it, the obtained DOC powder is mixed with a binder and water, then, a nitric acid aqueous solution for adjusting the viscosity of the slurry is added to the mixture, and the resulting mixture is stirred. As a result, slurry is obtained. This slurry is applied onto the cell wall 1 of the honeycomb substrate, and dried and then calcined. As a result, the DOC layer 2 is formed on the cell wall of the substrate.

In forming the DOC layer 2 with a double-layer structure illustrated in FIG. 3, catalytic metals are loaded on each of zeolite and a mixture of activated alumina and ceria independently by evaporation to dryness method to obtain respective powders. Then, the respective powders are slurried. This slurry including the mixture of activated alumina and ceria is applied onto the cell wall 1 of the substrate and is dried. Then, the slurry including zeolite is applied onto the resultant, dried and calcined. This forms the first DOC layer 2a on the cell wall 1 of the substrate, and the second DOC layer 2b on the first DOC layer 2a. As a result, the DOC layer 2 with the double-layer structure is formed.

Next, an LNT support material layer which will be the LNT layer 3 is formed on the DOC layer 2. In order to form the LNT support material layer, activated alumina and ceria are mixed together first. A binder and water are added to the mixture, and the resultant mixture is stirred to form slurry. This slurry is applied onto the DOC layer 2, dried, and then calcined. This forms the LNT support material layer on the DOC layer 2.

Next, an Rh support material layer which will be the $NO_x$ reduction layer 4 is formed on the LNT support material layer. In order to form the Rh support material layer, a binder and water are added to basic activated alumina or zirconia, and the resultant mixture is stirred to form slurry. This slurry is applied onto the LNT support material layer, dried, and then calcined. This forms the Rh support material layer on the LNT support material layer. Activated alumina or zirconia is used as a material to make the Rh support material layer. Instead of this, a mixture of activated alumina and zirconia can be used.

Next, a mixture solution of catalytic metals of Pt and Rh and an $NO_x$ storage material made of an alkali earth metal is prepared, and the respective layers on the substrate are formed is impregnated with the solution. These layers on the honeycomb substrate impregnated with the mixture solution are then dried and calcined. As a result, the LNT layer 3 is formed by loading the LNT support material layer with the catalytic metal and the $NO_x$ storage material as a result of the impregnation, and the $NO_x$ reduction layer 4 is formed by loading the Rh support material with particularly Rh as the catalytic metal a result of the impregnation. At that time, an acetate solution or nitrate solution each of which is an alkali earth metal is used for the $NO_x$ storage material. In the above production method, these layers on the substrate may be dried by maintaining it in the air at a temperature of about 100° C.-250° C. for a predetermined time, for example. Also, these layers on the substrate may be calcined by maintaining it in the air at a temperature of about 400° C.-600° C. for several hours, for example.

In the method for producing an exhaust gas purifying catalyst according to this embodiment, the LNT support material layer and the Rh support material layer are formed, and then, impregnated with and loaded with the catalytic metals of Pt and Rh and the $NO_x$ storage material. Basic zirconia and activated alumina that are the materials for the Rh support material layer have an affinity for Rh, and a large amount of Rh is therefore selectively introduced into the Rh support material layer. This easily enables the $NO_x$ reduction layer, which is the uppermost layer of the catalyst, to have a larger content of Rh than that in other layers. Therefore, $NO_x$ that has been stored in the $NO_x$ storage material in the LNT layer in a lean state of the exhaust gas passes through the $NO_x$ reduction layer with a large amount of Rh when the $NO_x$ is released in a rich state. As a result, the $NO_x$ released can be efficiently reduced and purified.

In this embodiment, after the LNT support material layer and the Rh support material layer are formed, they are impregnated with the solution containing Rh and the $NO_x$ storage material to form the LNT layer and the $NO_x$ reduction layer. However, the embodiment is not limited to this method. After the formation of the DOC layer and the LNT support material layer as described above, an $NO_x$ reduction layer containing Rh may be formed directly on the LNT support material layer.

Specifically, a powder obtained by loading Rh on alumina, zirconia, or the mixture thereof by evaporation to dryness method in advance is slurried, and this slurry is applied onto the LNT support material layer. Then, the resultant is dried and calcined to be able to form the $NO_x$ reduction layer containing Rh. At this time, the $NO_x$ reduction layer is prepared to have a larger content of Rh than that in other layers. After the formation of the $NO_x$ reduction layer, the LNT support material layer is impregnated with a solution containing an $NO_x$ storage material and Rh acting as a catalytic metal, and dried and calcined to be able to obtain the LNT layer. As a result, the exhaust gas purifying catalyst according to this embodiment can be obtained.

The use of such a method also easily allows for obtaining a catalyst of which the uppermost layer of the $NO_x$ reduction layer has a larger content of Rh than that in other layers.

The exhaust gas purifying catalyst according to this embodiment has the advantage described above. In addition to the advantage, it also improves combustion efficiency of particulate matters (PMs) disposed in an exhaust gas passage upstream of a particulate filter, and deposited on the particulate filter by controlling the air-fuel ratio of the exhaust gas. A method for purifying exhaust gas using such a catalyst according to the embodiment will now be described.

(Example of Use of Catalyst)

The exhaust gas purifying catalyst according to the embodiment is arranged upstream of a particulate filter of an exhaust gas passage of an engine in a flow direction of exhaust gas, an $NO_x$ sensor for detecting an $NO_x$ concentration is arranged downstream of the filter, and a pressure sensor is arranged at each of the inlet and outlet of the filter. This arrangement can allow measurement of an amount of $NO_x$ stored in the $NO_x$ storage material in the catalyst based on the $NO_x$ concentration of the exhaust gas having passed through the catalyst, and an amount of PMs deposited on the filter based on a differential pressure detected by the pressure sensor provided for each of the inlet and the outlet of the filter. The amount of $NO_x$ stored in the $NO_x$ storage material and the amount of PMs deposited on the particulate filter are predetermined. When the predetermined amount or more of $NO_x$ is stored and the predetermined amount or more of PMs is deposited, the engine is controlled to perform, after performing a main injection in which fuel is injected into and supplied to a combustion chamber of the engine near a top dead center of a compression stroke, a subsequent injection in which fuel is injected and supplied in an expansion stroke or an exhaust stroke. Then, $NO_x$ is reduced and purified by increasing HC and CO in the exhaust gas and turning the air-fuel ratio of the exhaust gas rich. Oxidative combustion of the PMs is performed by raising the temperature of the catalyst using the heat generated during the oxidative combustion while increasing HC and CO in the exhaust gas and maintaining the lean state of the air-fuel ratio. It is preferable to provide a controller connected to the $NO_x$ sensor and the pressure sensor and configured to control fuel injection.

When the air-fuel ratio of the exhaust gas is in a lean state, $NO_x$ in the exhaust gas is stored in the $NO_x$ storage material, and HC in the exhaust gas is adsorbed onto zeolite, as described above. Then, when the predetermined amount or more of $NO_x$ is stored, the subsequent injection is performed as described above and the air-fuel ratio of the exhaust gas is turned rich to release the $NO_x$ from the $NO_x$ storage material. The $NO_x$ released is reduced and purified by Rh in the $NO_x$ reduction layer when passing through the $NO_x$ reduction layer. When the predetermined amount or more of PMs is deposited on the downstream particulate filter, the subsequent injection is performed while the state of the exhaust gas is kept lean to cause oxidative combustion of HC in the exhaust gas by the catalytic metals such as Pt and Pd. This causes desorption and oxidative combustion of HC that has been adsorbed on zeolite. This raises the temperature of the exhaust gas flowing through the particulate filter, thereby enabling to burn the particulate matters with high efficiency.

In this way, the use of the one catalyst stores $NO_x$ in the lean state, reduces the $NO_x$ in the rich state, and raises the temperature of the exhaust gas with the heat generated during the oxidation in regeneration of the particulate filter. Accordingly, a catalytic capacity can be reduced.

Examples

Examples will now be shown to specifically describe exhaust gas purifying catalysts according to the present invention. In Examples, exhaust gas purifying catalysts were prepared based on the method for producing an exhaust gas purifying catalyst using a cordierite hexagonal-cell honeycomb substrate (with a diameter of 24.5 mm and a length of 50 mm) having a cell wall thickness of 4.5 mil ($1.143 \times 10^{-1}$ mm) and including 400 cells per square inch (645.16 mm$^2$) The HC purification ability and $NO_x$ storage ability of these catalysts were evaluated.

Components of the exhaust gas purifying catalysts according to Examples 1-3 and Comparative Examples 1-5 will now be described. In Examples 1-3, the DOC layer has a double-layer structure as illustrated in FIG. 3, and the respective catalysts were produced using the above described production method. The first DOC layer that is the lower layer of the DOC layer contains 60 g/L (i.e., "amount per 1 L of the substrate," the same goes for the rest of the description) of activated alumina, 40 g/L of ceria, 1.2 g/L of Pt, and 0.6 g/L of Pd as the loaded catalytic components. The second DOC layer that is the upper layer contains 100 g/L of zeolite, 0.4 g/L of Pt, and 0.2 g/L of Pd as the respective loaded catalytic components. The LNT support material layer contains 40 g/L of activated alumina, and 40 g/L of ceria as the loaded catalytic components. The Rh support material layer in Example 1 contains 20 g/L activated alumina as the catalytic component, the Rh support material layer in Example 2 contains 20 g/L of zirconia as the catalytic component, and the Rh support material layer in Example 3 contains 20 g/L of a composite oxide of activated alumina and zirconia as the catalytic component with a mass ratio of alumina:zirconia=60:40. This composite oxide can be obtained by adding a basic solution such as ammonia water to an acid solution containing aluminum ions and zirconium ions, coprecipitating a precursor of alumina and a precursor of zirconia, and drying and calcining the resultant. The obtained composite oxide consists of composite oxide particles in which primary particles of alumina and primary particles of zirconia are substantially uniformly mixed together. After the formation of these layers, these layers on the substrate are impregnated with and loaded with 30 g/L of Ba and 10 g/L of Sr acting as the NOx storage material, 4.3 g/L of Pt, and 0.5 g/L of Rh to form the LNT layer from the LNT support material layer, and the $NO_x$ reduction layer from the Rh support material layer.

The catalyst in Comparative Example 1 has a structure in which only the DOC layer with a single layer structure is formed on the substrate. The DOC layer with the single layer structure contains 100 g/L of zeolite, 60 g/L of activated alumina, 40 g/L of ceria, 1.6 g/L of Pt, and 0.8 g/L of Pd as the loaded catalytic components. The catalyst in Comparative Example 2 is obtained by forming an Rh support material layer containing 20 g/L of activated alumina as a component on the DOC layer with the single layer structure, and loading these layers, which are on the substrate, with 30 g/L of Ba and 10 g/L of Sr acting as the $NO_x$ storage materials, 4.3 g/L of Pt, and 0.5 g/L of Rh as a result of impregnation. The catalyst in Comparative Example 3 has the same structure as that in Comparative Example 2, except that the DOC layer has a double-layer structure. The catalyst in Comparative Example 4 has the same structure as that in Comparative Example 2, except that 20 g/L of zirconia is used as a component of the Rh support material layer. The catalyst in Comparative Example 5 has the same structure as that in Comparative Example 3, except that 20 g/L of zirconia is used as a component of the Rh support material layer.

In Example 1-3 and Comparative Examples 1-5, β-zeolite was use as zeolite. The calcination during preparation of the respective catalytic powders, and the calcination after the application of the catalytic powders were all performed in the air at a temperature of 500° C. for two hours.

The measurement test of HC purification ability and the measurement test of an amount of $NO_x$ stored which are conducted with respect to the catalysts of Examples 1-3 and Comparative Examples 1-5, and its results will be described below.

In the measurement test of HC purification ability, the respective honeycomb catalysts of Examples 1-3 and Comparative Examples 1-5 were subjected to an aging treatment in a gas atmosphere comprising 2% of $O_2$, 10% of $H_2O$, and $N_2$ as the balance at 750° C. for 24 hours. The honeycomb catalysts were loaded into a model gas flow reactor, and the gas temperature at a catalyst entrance was maintained at 100° C. with $N_2$ gas allowed to circulate through the honeycomb catalysts. Then, a model gas for evaluating the HC purification capacity was introduced.

The model gas has a composition including 600 ppmC of n-octane, 150 ppmC of ethylene, 50 ppmC of propylene, 1500 ppm of CO, 30 ppm of NO, 10% of $O_2$, 10% of $H_2O$, and $N_2$ as a balance, and its space velocity was 72000/h.

Figure 4:
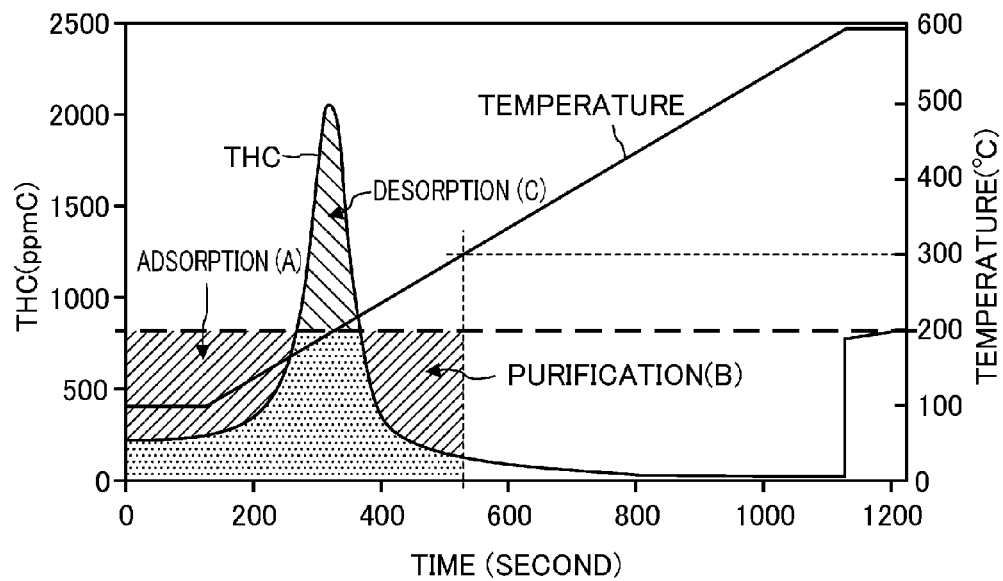
FIG. 4 is a graph showing how the total HC concentration of a gas emitted from the catalyst and a catalyst entrance temperature change during an HC purification performance evaluation test.

The gas temperature at a catalyst entrance model gas started to be increased when two minutes passed since the model gas had started to be introduced, and a total HC concentration (THC) of the gas emitted from the honeycomb catalyst was measured. FIG. 4 shows an exemplary result of the measurement.

The temperature of the catalyst is low for a while after the model gas has started to be introduced, and therefore, HC in the model gas gets adsorbed on zeolite. Therefore, the THC of the emitted gas is lower than 800 ppmC that is the THC of the model gas. The amount of HC adsorbed on zeolite gradually decreases as the catalyst temperature rises. And when the gas temperature at the catalyst entrance reaches the vicinity of 200° C., the amount of HC desorbed exceeds the amount of HC adsorbed on zeolite, and the THC begins to rise steeply to be higher than 800 ppmC. The higher the catalyst temperature, the more and more active the catalyst gets to allow DOC to start purifying the desorbed HC. As a result, the THC falls steeply to be lower than 800 ppmC.

Then, the HC purification rate of each of the honeycomb catalysts of Examples 1-3 and Comparative Examples 1-5 was calculated for a period between a point in time when the model gas started to be introduced and a point in time when the gas temperature reached 300° C. The HC purification rate was calculated by subtracting the amount of HC desorbed (C) from the sum of the decrease in THC (A) caused by the HC adsorption and the decrease in THC (B) caused by the HC purification as shown in FIG. 4. The results are shown in FIG. 5.

Figure 5:
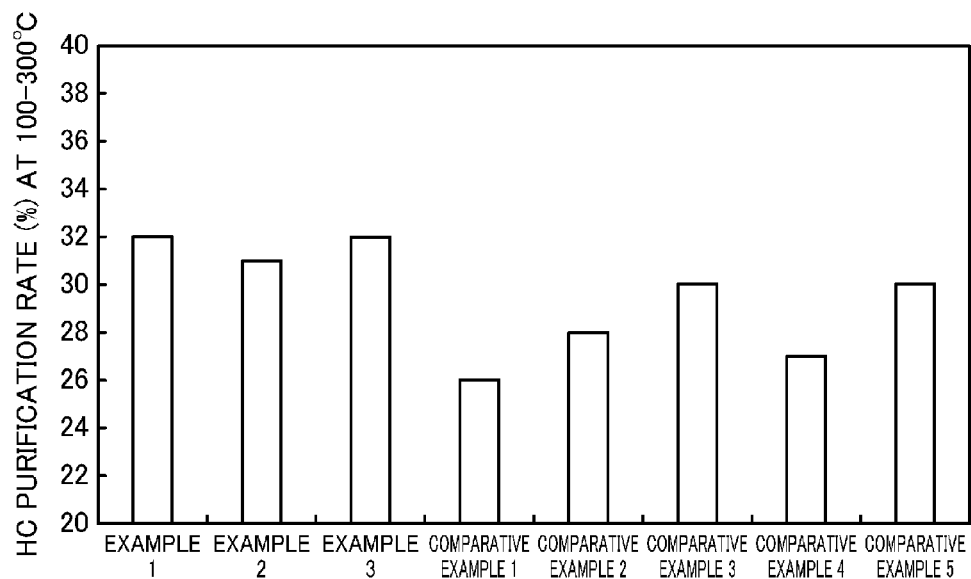
FIG. 5 is a graph showing HC purification rates in Examples and Comparative Examples of the present invention.

As shown in FIG. 5, in comparison among Examples 1-3 and Comparative Examples 1-5, the catalysts in Examples 1-3 including the DOC layer, the LNT layer, and the $NO_x$ reduction layer have a higher HC purification rate than that in each of Comparative Examples 1-5. In comparison among Examples 1-3, there is no large difference among them.

On the other hand, in the measurement test of the $NO_x$ storage ability, the respective honeycomb catalysts of Examples 1-3 and Comparative Examples 1-5 were subjected to the same aging treatment as when the HC purification rate was measured, and then loaded into a model gas flow reactor. The gas temperature at a catalyst entrance was maintained at 200° C. with model gas with a rich air-fuel ratio allowed to circulate through the honeycomb catalyst. The gases were changed into a model gas with a lean air-fuel ratio with that temperature maintained, and the gases were changed once again into a model gas with a rich air-fuel ratio when 180 seconds passed since the model gases were changed.

Figure 6:
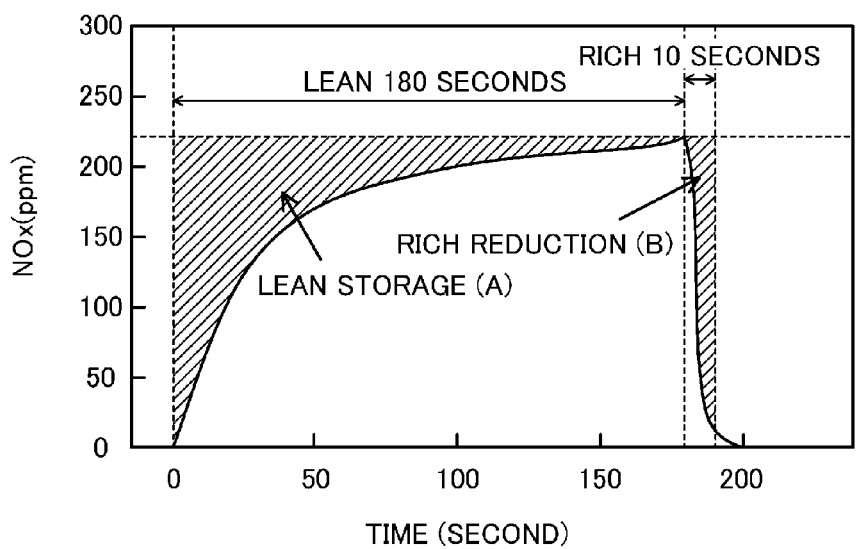
FIG. 6 is a graph showing how the $NO_x$ concentration of a gas emitted from the catalyst changes during an $NO_x$ purification performance evaluation test.

FIG. 6 shows an exemplary result of measurement of an NOx concentration of the gas emitted from the honeycomb catalyst. The $NO_x$ concentration starts to increase as soon as the types of the model gas are changed from rich to lean, and continues to rise with time after that. Then, as the $NO_x$ storage amount gets close to a saturation point, the NOx concentration of the model gas approaches 220 ppm asymptotically. When the types of the model gas are changed from lean to rich, $NO_x$ is released from the $NO_x$ storage material. However, since a reducing agent (HC and CO) is supplied due to the change into the rich type, $NO_x$ gets reduced by Pt and Rh at a steep rate. As a result, the $NO_x$ concentration of the emitted gas decreases steeply.

The $NO_x$ purification rate for 190 seconds in total was calculated based on the decrease in $NO_x$ (A) caused by $NO_x$ storage for 180 seconds in a lean state and the decrease in $NO_x$ (B) caused by $NO_x$ reduction for 10 seconds in a rich state as shown in FIG. 6. The average $NO_x$ purification rate for 190 seconds in total was calculated in the same way with the gas temperature at the catalyst entrance set to be 250° C.

The rich model gas has a composition including 220 ppm of NO, 3400 ppmC of HC, 1.0% of CO, 0.5% of $O_2$, 6% of $CO_2$, 10% of $H_2O$, and $N_2$ as the balance. The results of the measurement test of the $NO_x$ storage ability are shown in FIG. 7.

Figure 7:
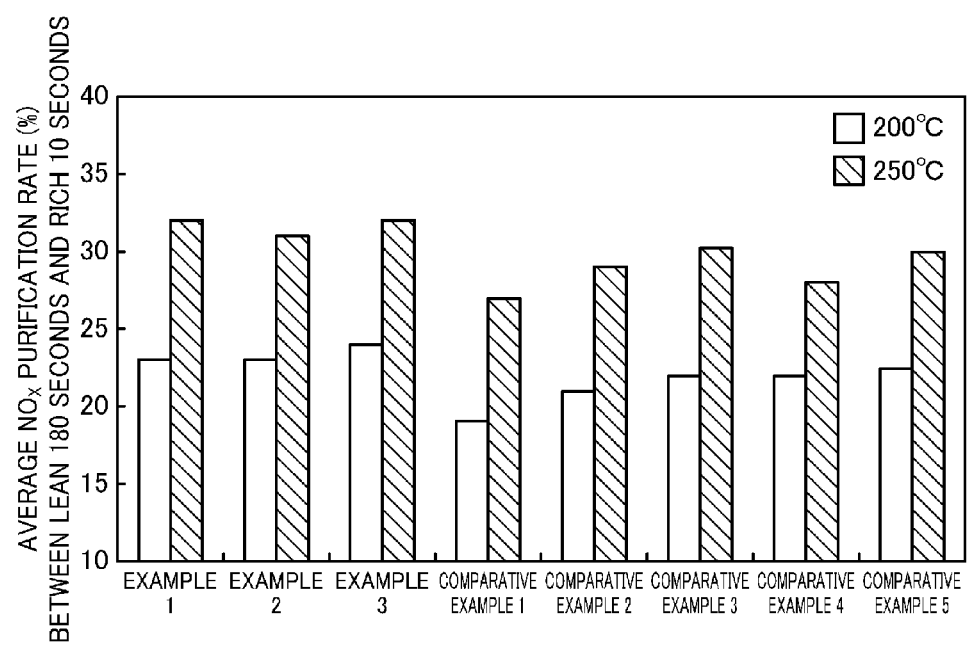
FIG. 7 is a graph showing amounts of $NO_x$ stored in Examples and Comparative Examples of the present invention.

As shown in FIG. 7, in comparison among Examples 1-3 and Comparative Examples 1-5, the catalysts in Examples 1-3 including the DOC layer, the LNT layer, and the $NO_x$ reduction layer has a higher $NO_x$ purification rate than that in each of Comparative Examples 1-5. In comparison among Examples 1-3, there is no large difference among them.

The results of the HC purification ability test and the $NO_x$ purification ability test show that the catalyst including the DOC layer, the LNT layer, and the $NO_x$ reduction layer has a higher HC purification ability and a higher $NO_x$ purification ability than those of the catalyst including only the DOC layer or only the DOC layer and the $NO_x$ reduction layer. The HC purification ability is higher for the following reason. A solution including an $NO_x$ storage material was impregnated after formation of a layer containing ceria and alumina which have an affinity for the $NO_x$ storage material on the DOC layer containing zeolite. This can reduce the content of the $NO_x$ storage material in the DOC layer, and reduce degradation of HC adsorption ability of zeolite due to the $NO_x$ storage material. As a result, much HC is adsorbed, and most of that HC causes oxidation reaction when the activity of the catalyst increases with the rise in temperature. That is probably why the HC purification ability is higher. On the other hand, the $NO_x$ purification ability is higher probably because the $NO_x$ storage material in the LNT layer in the lean gas state stores $NO_x$ in the model gas, and the $NO_x$ is released when the gas state is turned rich, and is reduced with high efficiency by the $NO_x$ reduction layer rich in Rh.

INDUSTRIAL APPLICABILITY

As described above, the use of the exhaust gas purifying catalyst according to the present invention advantageously oxidizes and purifies HC and $NO_x$.

DESCRIPTION OF REFERENCE CHARACTERS

1 substrate (cell wall)
2 DOC (diesel oxidation catalyst) layer
2a first DOC (diesel oxidation catalyst) layer
2b second DOC (diesel oxidation catalyst) layer
3 LNT (lean $NO_x$ trap) layer
4 $NO_x$ reduction layer
5 exhaust gas passage

The invention claimed is:
1. An exhaust gas purifying catalyst comprising:
a substrate;
an oxidation catalyst layer formed on the substrate, and containing zeolite and at least one catalytic metal;
a lean $NO_x$ trap (LNT) layer formed on the oxidation catalyst layer, and containing an $NO_x$ storage material and at least one catalytic metal; and
an $NO_x$ reduction layer formed on the LNT layer, and containing Rh acting as a catalytic metal and at least one of alumina or zirconia, wherein
the oxidation catalyst layer includes a first oxidation catalyst layer containing alumina and ceria, and a second oxidation catalyst layer formed on the first oxidation catalyst layer and containing zeolite, and the $NO_x$ reduction layer has a larger content of Rh than in each of the oxidation catalyst layer and the LNT layer.

2. The exhaust gas purifying catalyst of claim 1, wherein the LNT layer further contains alumina and ceria.

3. The exhaust gas purifying catalyst of claim 1, wherein zeolite in the oxidation catalyst layer has an average particle size of 0.5 μm or more and 4.8 μm or less.

4. The exhaust gas purifying catalyst of claim 2, wherein zeolite in the oxidation catalyst layer has an average particle size of 0.5 μm or more and 4.8 μm or less.

5. A method for purifying exhaust gas, the method comprising:
- disposing the exhaust gas purifying catalyst of claim 1 upstream of a particulate filter provided for an exhaust gas passage of an engine in a flow direction of exhaust gas;
- turning an air-fuel ratio of the exhaust gas lean and allowing the $NO_x$ storage material to store $NO_x$ in the exhaust gas;
- releasing $NO_x$ from the $NO_x$ storage material when a predetermined amount or more of $NO_x$ is stored in the $NO_x$ storage material by controlling the engine such that a subsequent injection in which fuel is injected into and supplied to a combustion chamber of the engine in an expansion stroke or an exhaust stroke after a main injection in which fuel is injected into and supplied to the combustion chamber of the engine near a top dead center of a compression stroke is performed to increase HC in the exhaust gas, and turning the air-fuel ratio of the exhaust gas rich;
- allowing Rh to reduce and purify the $NO_x$ released when the $NO_x$ released passes through the $NO_x$ reduction layer, and
- burning the particulate matters when a predetermined amount or more of particulate matters is deposited on the particulate filter by performing the subsequent injection after the main injection with the air-fuel ratio of the exhaust gas maintained lean, performing oxidative combustion of HC in the exhaust gas by Pt and Pd, and raising a temperature of the exhaust gas flowing into the particulate filter.

6. The exhaust gas purifying catalyst of claim 1, wherein the LNT layer contains Rh acting as the catalytic metal.

7. An exhaust gas purifying catalyst comprising:
a substrate;
an oxidation catalyst layer formed on the substrate, and containing zeolite and at least one catalytic metal;
a lean $NO_x$ trap (LNT) layer formed on the oxidation catalyst layer, and containing an $NO_x$ storage material and at least one catalytic metal; and
an $NO_x$ reduction layer formed on the LNT layer, and containing Rh acting as a catalytic metal and at least one of alumina or zirconia, wherein
the LNT layer contains Rh acting as the catalytic metal, and
the $NO_x$ reduction layer has a larger content of Rh than in each of the oxidation catalyst layer and the LNT layer.

* * * * *